Oct. 25, 1960 W. M. BOLTON 2,957,779

GAS PLATING METHOD UTILIZING A GREASE MASKING AGENT

Filed June 3, 1957

INVENTOR.
WILBUR M. BOLTON

BY Toulmin & Toulmin

ATTORNEYS

United States Patent Office 2,957,779

Patented Oct. 25, 1960

2,957,779

GAS PLATING METHOD UTILIZING A GREASE MASKING AGENT

Wilbur M. Bolton, Piqua, Ohio, assignor, by mesne assignments, to Union Carbide Corporation, New York, N.Y., a corporation of New York Filed June 3, 1957, Ser. No. 663,146

2 Claims. (Cl. 117—5.5)

This invention relates to the metallizing of materials by means of deposition of metal from the gaseous state and is particularly concerned with the masking off of selected areas of a substrate to inhibit metallic deposition thereon; further, the invention is specifically concerned with masking agents which not only inhibit the metallic deposition but which are readily removed from a substrate after completion of metallizing and which provide a sharp line of demarcation between a metallized and a non-metallized area.

The invention has been found to be of considerable utility in the production of printed circuits wherein an electrically conductive film of metal of relatively narrow width and frequently serpentine configuration is provided on a substrate of insulating material, such as a board of a phenolic resin, for example.

In accordance with this invention a masking agent which exhibits particular utility in gas plating applications, including the plating of printed circuits comprises a high molecular weight, low vapor pressure, heat resistant material which has a poor degree of adherency to, and may be readily wiped free of, other substances which are subject to metallizing by gaseous plating. Such masking agent materials include greasy materials of wide compass; for example, silicone greases which are essentially silicone oils compounded with inert fillers; chlorinated biphenyls and similar chlorinated compounds containing two or more aromatic nuclei which are marketed as Aroclors and include a whole series of materials varying in viscosity and boiling point, depending on the complexity of the nuclei and degree of chlorination; solid Aroclors which are applicable to heated surfaces and of particular utility in higher temperature ranges; and lubricants in the form of high viscosity greases and heavy oils.

Such masking agents, it has been found, will not receive an adherent metal plate when contacted by heat-decomposable metal-bearing gases such as nickel carbonyl, iron pentacarbonyl and chromium hexacarbonyl, for example.

Accordingly areas of an object to be plated or metallized may be defined in outline by application of the masking agent to the object to cover areas which are not to be plated; at the conclusion of the plating operation the masking agent is usually suitably removable from the object by wiping or washing with a suitable solvent. Accordingly the masking agent should generally not be hardenable at the temperature of its utilization to an extent sufficient to prevent its removal by simple procedures.

In addition to masking off to provide definite configurations on a surface the agent is also useful in prevention of metallic deposition on those surfaces of a multi-surface object which it is not desired to metallize.

The invention will be more fully understood by reference to the following detailed description and accompanying drawings wherein.

Figure 2:
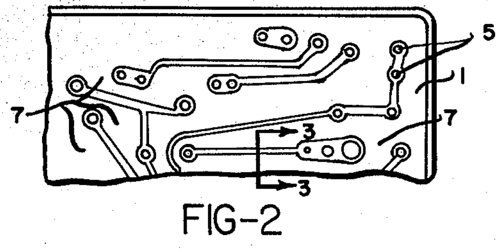
Figure 2 is a plan view of a board of insulating material masked off for the formation of a printed circuit utilizing the apparatus of Figure 1.
Figure 3:
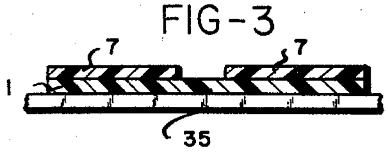
Figure 3 is an enlarged and sectional view of the board of Figure 2 taken substantially on line 3—3 of Figure 2.
Figure 4:
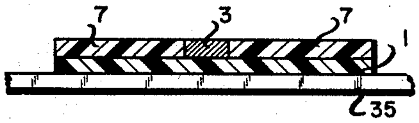
Figure 4 is a view similar to that of Figure 3 after metallizing and before removal of the masking agent.

Referring to the drawings and initially particularly to Figure 2, the numeral 1 designates a thin rectangular board of electrical insulating material such as a phenolic resin base board. Coated on the board 1 and outlining a configuration 3 for a printed circuit which is to include terminals as at 5 is a masking agent 7 produced in accordance with the principles of this invention.

The board 1 prior to the metallizing operation should be thoroughly cleaned chemically and suitably also by sand blasting or with a 320 grit emery, for example. A silicone grease is then spread on the board 1 in any convenient manner to form a thin film and to outline the configuration of the printed circuit on the board. For example, a stencil which outlines the circuit may be initially placed on the board and the grease applied to the board around the stencil. The grease, of course, should be relatively viscous, at least to the consistency of a heavy syrup, to inhibit flow at the temperature at which the metallizing operations take place.

Figure 1:
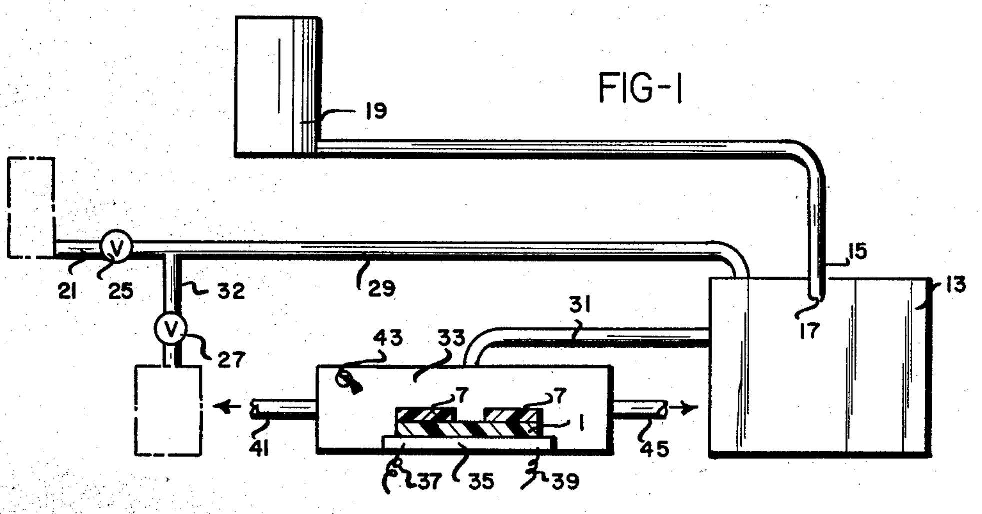
Figure 1 is a schematic view illustrating apparatus useful in the practice of the invention.

The board 1 with the film formed thereon outlining the desired configuration is then placed in the apparatus of Figure 1, where it is exposed to an atmosphere of plating gas. Such gas may suitably be nickel carbonyl and the temperature of the board within the chamber is then brought up to 285–290° F., as will be noted hereinafter in connection with the specific description of the apparatus.

As the board 1 and the film 7 are heated some slight amount of smoke may be evolved, but such is not detrimental to the deposition of metal on the areas which are unmasked. Such evolution of smoke may also contribute to noncoherency of any metal which tends to plate onto the grease film 7. Such noncoherency is important in permitting the ultimate removal of the grease at the end of the plating operation.

Figure 5:
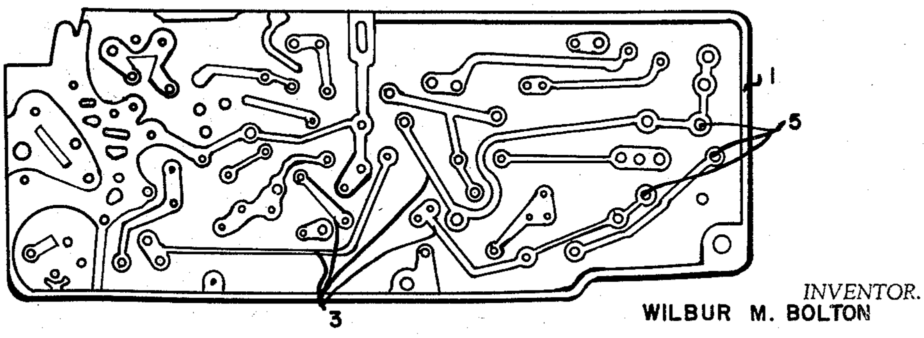
Figure 5 is a plan view of the product of the operation in full scale and after removal of the masking agent.

With the masking agent specifically referred to above, that is a silicone grease type agent, an exposure time of about 40 minutes, and temperatures up to 200° F., has been found not to detrimentally affect the grease film and removal thereof simply by a wiping of the board 1 is wholly effective. Upon completion of the metallizing the films may be removed simply by wiping, or, if desired, by washing in a suitable solution, which does not affect the insulation board 1. The masking agent is completely removable and leaves a finely delineated circuit configuration (Figure 5).

Referring now more particularly to the exemplary apparatus illustrated in Figure 1, the numeral 13 designates a vaporizing chamber, while the numeral 15 indicates a conduit extending into the chamber, terminating in a nozzle 17, and which is adapted for the flow of nickel carbonyl to the chamber from a suitable source of liquid carbonyl indicated at 19.

Leftwardly in Figure 1, the numeral 21 designates a conduit which is connected to a source of argon, while the numeral 32 designates a conduit which is connected to a source of anhydrous ammonium gas. Valves 25, 27 are provided in the respective conduits for the control of gas flow.

The argon and ammonia mix together in the conduit 29 and flow to the chamber 13, where they mix and serve as a carrier for the nickel carbonyl gas formed by the flash vaporizing of the liquid nickel carbonyl. This plating gas then passes through conduit 31 to the plating chamber 33 which, in its lower portion, is provided with a platen 35 adapted to be heated electrically through leads 37, 39. As indicated in Figure 1 the insulating board 1 is placed on and heated from the platen 35.

The rate of flow of nickel carbonyl gas in the specific embodiment of the invention under consideration was about 2140 cc. per minute for a period of 17 minutes, while the rate of flow of argon was about 4900 cc. per minute (standard conditions) and the ammonia gas flow was about 9 cc. per minute.

Prior to the entry of the plating carbonyl gas it is preferable to flush the chamber free of air and other contaminants, and such may be effectively accomplished by flowing argon and ammonia through the chamber for a period of 7 or 8 minutes. Similarly, before removal of the board from the chamber it is preferable to flush the chamber free of any gases therein containing the carbonyl or smoke by the passage of the argon and ammonia through the chamber.

Gases are exhausted from the plating chamber 33 through conduits as at 41, 43, 45. These exhaust gases may suitably be flowed to a burner or to a recovery apparatus as desired.

In connection with the plating operation it is desirable that the plating chamber be of sufficient size, such that no build-up of pressure of the vehicle will occur over the areas which are to be metallized. This is not a critical matter and obviously the volume should be such that no material amount of smoke, for example, exists in the vapor pressure within the plating chamber.

In a further embodiment of the invention a lubricant was rolled onto a back only of a sample in order to inhibit deposition on the back while the forward surface was completely exposed to the plating gas. In this operation the lubricant, which is marketed under the trade name Andox Lubricant "C," was exposed to the heat for approximately 25 minutes at about 300° F. The chamber was initially flushed with approximately 6200 cc. of argon gas per minute and about 9 cc. of ammonia gas per minute (standard conditions) and the metallizing operation time at the temperature noted was approximately 10 minutes; after the metallizing by the passage of nickel carbonyl at a rate of approximately 2200 cc. per minute the chamber was again flushed with argon and ammonia to clear the same of any residual metallizing gas and smoke. Again the sample, upon removal of the plating chamber, was wiped clean with a cloth, leaving a good adherent coat on the untreated surface.

The desirability of flushing the chamber clean before removal of the sample is due to the tendency of a slightly dark halo to occasionally form on the nickel surface, and such formation tends to be inhibited if the chamber is first flushed free of all smokes.

The ammonia utilized in the plating operation is preferably very small in percentage, as will be noted from the foregoing, and it tends to provide a mirror finish on the deposited metal.

It will be understood that this invention is susceptible to modification in order to adapt it to different usages and conditions and accordingly, it is desired to comprehend such modifications within this invention as may fall within the scope of the appended claims.

I claim:

1. A process for the production of metallic deposits on selected surface portions of an object, which comprises applying to said object a masking agent to delineate the contour of the area to be gas plated with metal, said masking agent consisting of a grease composed principally of silicone resin which is heat-resistant and non-hardenable and retains its shape at a temperature of 300° F., and which resin remains in place at a temperature of gas plating the metal thereon, heating the object with the masking agent thereon in an enclosed vessel to a temperature on the order of 300° F. to decompose a metal bearing heat-decomposable gaseous compound, passing said heat-decomposable gaseous compound to the object to be plated while the object is maintained at the decomposition temperature of the compound and thereby to deposit on the unmasked portions of the object metal from the heat-decomposable compound while deposition of metal on the masking agent is inhibited.

2. A process for the production of metallic deposits on selected surface portions of an object, which comprises applying to said object a masking agent to delineate the contour of the area to be gas plated with metal, said masking agent consisting of a grease composed principally of methyl silicone resin which is heat-resistant and non-hardenable and retains its shape at a temperature of 300° F., and which resin remains in place at the temperature of gas plating the metal thereon, heating the object with the masking agent thereon in an enclosed vessel to a temperature on the order of 300° F. to decompose a metal bearing heat-decomposable gaseous compound, passing said heat-decomposable gaseous compound to the object to be plated while the object is maintained at the decomposition temperature of the compound and thereby to deposit on the unmasked portions of the object metal from the heat-decomposable compound while deposition of metal on the masking agent is inhibited.

References Cited in the file of this patent

UNITED STATES PATENTS

| | | |
|---|---|---|
| 2,138,892 | Strab et al. | Dec. 6, 1938 |
| 2,139,640 | Mall et al. | Dec. 6, 1938 |
| 2,790,731 | Ostrofsky et al. | Apr. 30, 1957 |

OTHER REFERENCES

Fortune, "The Silicones," May 1947, page 104 relied on.